US010614574B2

(12) United States Patent
Zhang

(10) Patent No.: US 10,614,574 B2
(45) Date of Patent: Apr. 7, 2020

(54) GENERATING IMAGE SEGMENTATION DATA USING A MULTI-BRANCH NEURAL NETWORK

(71) Applicant: Adobe Inc., San Jose, CA (US)

(72) Inventor: Jianming Zhang, Campbell, CA (US)

(73) Assignee: Adobe Inc., San Jose, CA (US)

(*) Notice: Subject to any disclaimer, the term of this patent is extended or adjusted under 35 U.S.C. 154(b) by 136 days.

(21) Appl. No.: 15/784,918

(22) Filed: Oct. 16, 2017

(65) Prior Publication Data

US 2019/0114774 A1 Apr. 18, 2019

(51) Int. Cl.
*G06K 9/34* (2006.01)
*G06K 9/62* (2006.01)
*G06K 9/20* (2006.01)
*G06T 7/11* (2017.01)
*G06T 7/13* (2017.01)
*G06N 3/04* (2006.01)
*G06N 3/08* (2006.01)
*G06N 7/00* (2006.01)

(52) U.S. Cl.
CPC .............. *G06T 7/11* (2017.01); *G06N 3/04* (2013.01); *G06N 3/0454* (2013.01); *G06N 3/08* (2013.01); *G06T 7/13* (2017.01); *G06N 7/005* (2013.01); *G06T 2207/20076* (2013.01); *G06T 2207/20081* (2013.01); *G06T 2207/20084* (2013.01)

(58) Field of Classification Search
USPC .......................................... 382/158, 173, 283
See application file for complete search history.

(56) References Cited

U.S. PATENT DOCUMENTS

| 6,301,385 | B1* | 10/2001 | Chen .................. G06K 9/34 375/E7.081 |
| 10,169,679 | B1* | 1/2019 | Kim ................... G06K 9/6256 |
| 2015/0363634 | A1* | 12/2015 | Yin .................. G06K 9/00221 382/118 |
| 2017/0124409 | A1* | 5/2017 | Choi .................. G06N 3/0454 |
| 2017/0243053 | A1* | 8/2017 | Li ..................... G06K 9/00281 |
| 2017/0262995 | A1* | 9/2017 | Li ..................... G06N 3/0445 |
| 2017/0287137 | A1* | 10/2017 | Lin ................... G06K 9/66 |
| 2017/0357877 | A1* | 12/2017 | Lin .................. G06K 9/00228 |

(Continued)

OTHER PUBLICATIONS

Shuai et al "Toward achieving Robust Low-Level and High-Level Scene Parsing", Mar. 2019, IEEE transactions on image processing, vol. 28, No. 3. (Year: 2019).*

(Continued)

*Primary Examiner* — Kathleen Y Dulaney
(74) *Attorney, Agent, or Firm* — Kilpatrick Townsend & Stockton LLP

(57) ABSTRACT

A multi-branch neural network generates segmentation data for a received image. The received image is provided to a high-level branch and a low-level branch. Based on the received image, the high-level branch generates a feature map of high-level image features, and the low-level branch generates a feature map of low-level image features. The high-level feature map and the low-level feature map are combined to generate a combined feature map. The combined feature map is provided to a boundary refinement module that includes a dense-connection neural network, which generates segmentation data for the received image, based on the combined feature map.

20 Claims, 8 Drawing Sheets

(56) References Cited

U.S. PATENT DOCUMENTS

| | | | |
|---|---|---|---|
| 2018/0053056 A1* | 2/2018 | Rabinovich | G06F 1/163 |
| 2018/0061059 A1* | 3/2018 | Xu | G06N 3/0454 |
| 2018/0122082 A1* | 5/2018 | Mukherjee | G06N 3/0472 |
| 2018/0137338 A1* | 5/2018 | Kraus | G06K 9/6259 |
| 2018/0336454 A1* | 11/2018 | Lim | G06K 9/00664 |
| 2019/0073553 A1* | 3/2019 | Yao | G06K 9/46 |
| 2019/0102677 A1* | 4/2019 | Kim | G06N 3/084 |

OTHER PUBLICATIONS

Wang et al, "Deep conditional neural network for image segmentation", Aug. 29, 2016, 2016 IEEE International Conference on Multimedia and Expo (ICME) (Year: 2016).*

Bi et al, "Dermoscopic Image Segmentation via Multistage Fully Convolutional Networks" Jun. 2017, IEEE Transactions on Biomedical Engineering vol. 64, Issue: 9 , Sep. 2017 , pp. 2065-2074 (Year: 2017).*

Chen et al., "DeepLab: Semantic Image Segmentation with Deep Convolutional Nets, Atrous Convolution, and Fully Connected CRFs", IEEE, 2017.

Noh et al., "Learning Deconvolution Network for Semantic Segmentation", ICCV, 1520-1528.

Szegedy et al., "Rethinking the Inception Architecture for Computer Vision", University College London, Dec. 11, 2015.

\* cited by examiner

| EXAMPLE HIGH-LEVEL NEURAL NETWORK ARCHITECTURE ||
|---|---|
| INPUT | 224 x 224 x 3 |
| LAYER TYPE | OUTPUT SIZE |
| CONVOLUTIONAL | 112 x 112 x 64 |
| POOL | 56 x 56 x 64 |
| CONVOLUTIONAL | 56 x 56 x 64 |
| CONVOLUTIONAL | 56 x 56 x 192 |
| POOL | 28 x 28 x 192 |
| INCEPTION x 2 | 28 x 28 x 320 |
| INCEPTION x 1 | 14 x 14 x 576 |
| INCEPTION x 4 | 14 x 14 x 1024 |
| INCEPTION x 1 | 14 x 14 x 1024 |
| INCEPTION x 2 | 14 x 14 x 1024 |
| CONVOLUTIONAL | 14 x 14 x 2 |

FIG. 7

| EXAMPLE LOW-LEVEL NEURAL NETWORK ARCHITECTURE ||
|---|---|
| INPUT | 224 x 224 x 3 |
| LAYER TYPE | OUTPUT SIZE |
| CONVOLUTIONAL | 224 x 224 x 64 |

FIG. 8

| EXAMPLE BOUNDARY REFINEMENT MODULE ARCHITECTURE ||
|---|---|
| INPUT | 224 x 224 x 66 |
| LAYER TYPE | OUTPUT SIZE |
| DENSELY CONNECTED UNIT (x 3) | 224 x 224 x 162 |
| CONVOLUTIONAL | 224 x 224 x 2 |
| SOFTMAX | 224 x 224 x 2 |

FIG. 9

| RESOURCES USED BY SEGMENTATION NETWORKS | | | |
|---|---|---|---|
| | STORAGE SIZE | SPEED (PER IMAGE) | POST-PROCESSING REQUIRED? |
| Existing Combination Network | 500 MB | 3.7 SEC | YES |
| Multi-branch Neural Network | 40 MB | 0.4 SEC | NO |

GENERATING IMAGE SEGMENTATION DATA USING A MULTI-BRANCH NEURAL NETWORK

FIELD OF THE INVENTION

This disclosure relates generally to the field of artificial intelligence, and more specifically relates to neural networks for analysis and segmentation of an image.

BACKGROUND

Image editing applications perform image segmentation to determine boundaries of regions within an image. Image segmentation is used, for example, to determine related areas of an image, such as related areas that form a figure of a person. An existing computing system including an image editing application uses an architecture combining one or more neural networks, such as a convolutional neural network (e.g., "CNN"), and one or more stages of post-processing to perform image segmentation on a received image. In available image segmentation systems, the one or more neural networks provide an image mask indicating an unrefined segmented area, and the one or more stages of post-processing refine the boundaries of the segmented area indicated by the image mask. The available image segmentation systems may use the post-processing stages to attempt to recreate details of the boundaries of the unrefined segmented area.

However, the inclusion of stages of post-processing reduces the speed at which the image editing application performs image segmentation, while increasing the computing system resources required to perform the segmentation. In addition, the segmentation mask generated by the combination of the neural networks with the stages of post-processing may include boundary artifacts that incorrectly identify the boundaries of the segmented area. A neural network architecture that can produce accurate image segmentation without including stages of post-processing may provide more accurate segmentation information while consuming fewer computing system resources.

SUMMARY

According to certain embodiments, a multi-branch neural network receives an image. The multi-branch neural network includes a high-level branch with an encoder neural network for extracting high-level image features, and a low-level branch with another encoder neural network for extracting low-level image features. The received image is provided to the high-level branch, which generates a feature map of the high-level features. The received image is also provided to the low-level branch, which generates a feature map of the low-level features. The multi-branch neural network combines the high-level feature map and the low-level feature map. The combined feature map is provided to a boundary refinement module that includes a dense-connection neural network, which generates segmentation data for the received image, based on the combined feature map.

These illustrative embodiments are mentioned not to limit or define the disclosure, but to provide examples to aid understanding thereof. Additional embodiments are discussed in the Detailed Description, and further description is provided there

BRIEF DESCRIPTION OF THE DRAWINGS

Features, embodiments, and advantages of the present disclosure are better understood when the following Detailed Description is read with reference to the accompanying drawings, where:

FIG. 7 is a diagram depicting an example of an architecture for a high-level encoder module of a multi-branch neural network, according to certain embodiments;

FIG. 8 is a diagram depicting an example of an architecture for a low-level encoder module of a multi-branch neural network, according to certain embodiments;

FIG. 9 is a diagram depicting an example of an architecture for a boundary refinement module of a multi-branch neural network, according to certain embodiments;

DETAILED DESCRIPTION

Figure 1:
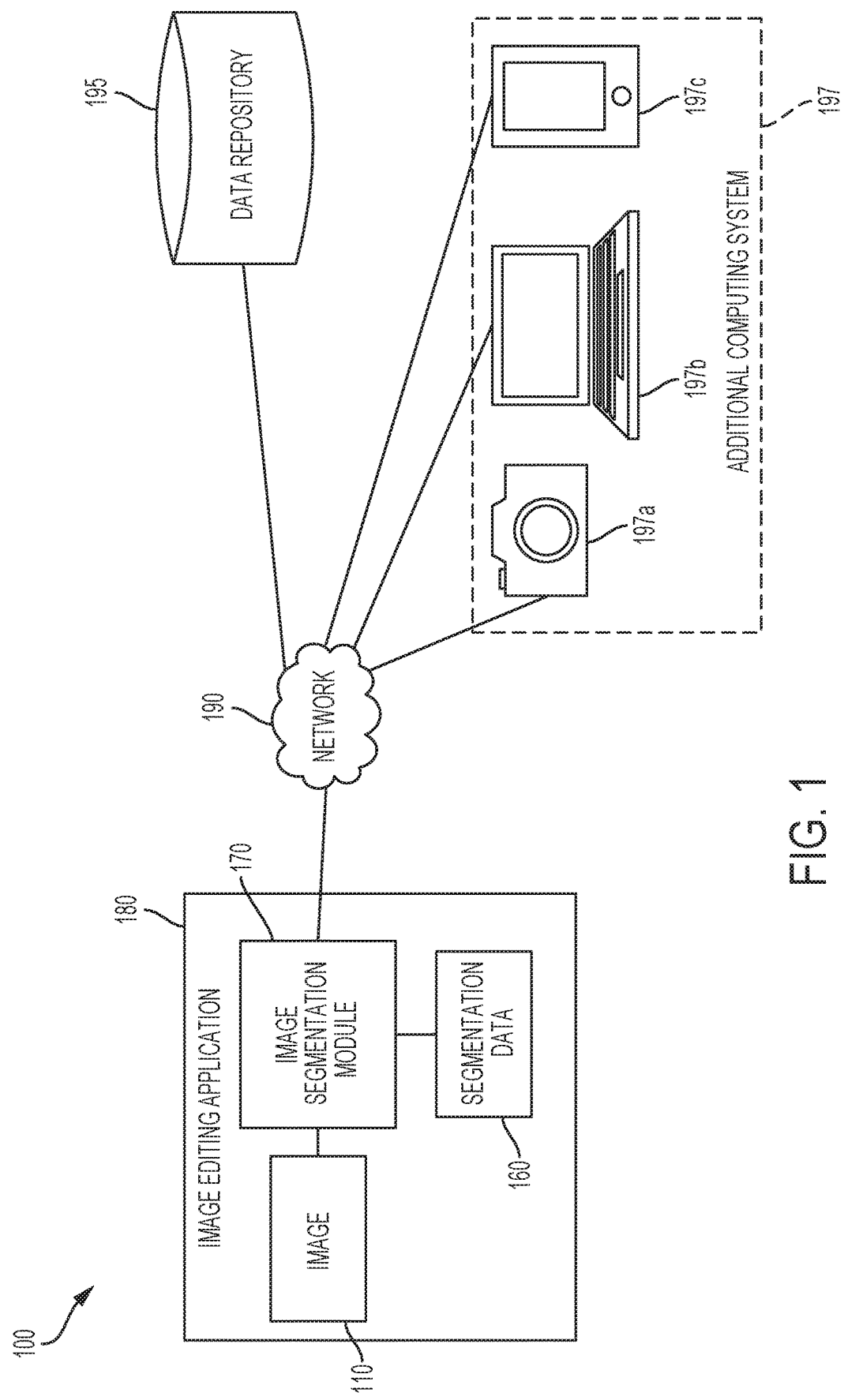
FIG. 1 is a block diagram depicting an example of an environment in which segmentation data is generated for an image, according to certain embodiments.

As discussed above, prior techniques for using neural networks to segment images fail to provide accurate image segmentation, even when consuming an increased amount of resources to do so. Certain embodiments described herein provide for a multi-branch neural network architecture that performs image segmentation with increased accuracy while requiring a reduced quantity of computing resources. For example, an image editing application provides accurate image segmentation information based on an image provided to a multi-branch neural network. In some embodiments, each branch in the multi-branch neural network extracts features from the image, and the features extracted by each branch are combined. A boundary refinement module of the multi-branch neural network provides image segmentation information based on the combined features. The image editing application, for example, provides the image segmentation information, such as via a user interface, or performs additional processing of the image based on the segmentation information, or both. In some cases, the multi-branch neural network performs an image segmentation using approximately 0.4 seconds of processing time. In addition, the multi-branch neural network occupies approximately 40 MB of storage space. A segmentation mask produced by the multi-branch neural network may include accurate boundaries that are clearly defined, or boundaries that are more accurate with fewer artifacts than a segmentation mask produced by a combination of a CNN with a stage of post-processing.

The following examples are provided to introduce certain embodiments of the present disclosure. A multi-branch neural network receives a graphical image for segmentation. The image includes, for example, graphical data representing a person standing in front of a background. The multi-branch neural network includes a high-level encoder neural network, a low-level encoder neural network, and a boundary refinement module. The image is provided to the high-level encoder and to the low-level encoder. In some cases, the high-level encoder and low-level encoder receive the same image. Additionally or alternatively, the image is not modified by pre-processing stages. Based on the image, the high-level encoder extracts one or more high-level features of the received image and generates a map of the extracted high-level features. The high-level features indicate, for example, whether the image includes a figure of a person, or how many people are present in the image. In addition, based on the image, the low-level encoder extracts one or more low-level features of the image and generates a map of the extracted low-level features. The low-level features indicate, for example, whether the image horizontal or vertical edges, or pixel areas of similar colors. In some cases, the multi-branch neural network combines the map of high-level features and the map of low-level features. The combined map is provided to the boundary refinement module. Based on the combined map of features and the image, the boundary refinement module determines whether each pixel in the image is associated with the segmentation mask.

An image editing application using an existing combination of a CNN with a stage of post-processing performs an image segmentation in a timeframe of approximately 4 seconds of processing time on a computing system that is accessible by the image editing application. In addition, the existing combination CNN and post-processing stage occupies approximately 500 megabytes (e.g., "MB") of storage space on the computing system accessible by the image editing application. An existing combination of a CNN with a stage of post-processing may generate a segmentation mask including inaccurate boundaries, or including boundary artifacts, such as portions of the segmentation mask that have poorly defined boundaries. It is beneficial to develop a neural network architecture that can produce accurate and clearly defined image segmentation at increased speed. It is also beneficial to develop a neural network architecture for segmentation that requires fewer computing system resources while performing accurate image segmentation.

As used herein, the term "image" refers to a graphical digital image depicting a graphical representation of subject matter. For example, an image uses pixels or vector-based graphics to represent a depiction of a human. In some cases, the image is a stand-alone image, such as a photograph, drawing, or scanned document. Additionally or alternatively, the image is included in a collection of images, such as a frame within an existing video or a page in a collection of document images.

As used herein, the term "feature" refers to a graphical quality of an image. An image can include low-level features describing fundamental qualities representing technical graphical aspects of the image, such as brightness, contrast, color, directional edges (e.g., vertical, horizontal, diagonal edges), textures depicted in the image, image resolution, or other suitable low-level features. In some cases, a low-level feature is determined at a pixel level, or close to a pixel level. Additionally or alternatively, the image can include high-level features describing contextual qualities representing graphical content of the image, such as semantic features. A semantic feature can describe the meaningful content of an image, such as image content representing a human figure, an object held by the human figure, an action occurring in the image, an emotion apparent in the image, background objects or figures, or other types of image content. In some cases, a high-level feature is determined based on the semantic content of the image, including content areas in the image (e.g., figures, objects), spatial relationships between areas of content (e.g., foreground, background), and categories of content (e.g., scenes, objects, actions).

In some cases, features include portions of the image, such as groups of pixels. Additionally or alternatively, features include graphical representations of the image, such as graphical representations of vertical edges in the image, or rounded edges in the image. Additionally or alternatively, features include transformations of the image, such as a blue-filtered transformation of the image (e.g., from a red-green-blue image format). In some cases, features include non-graphical representations of graphical qualities, such as a mathematical gradient based on lighting depicted in the image, or a data structure including an indication of whether the image includes a type of semantic content, such as a human figure.

As used herein, the term "segmentation" refers to analysis of an image to determine related areas of the image. In some cases, segmentation is based on semantic content of the image. For example, segmentation analysis performed on an image indicates a region of the image depicting a human figure. In some cases, segmentation analysis produces segmentation data. The segmentation data indicates one or more segmented regions of the analyzed image. For example, segmentation data includes a set of labels, such as pairwise labels (e.g., labels having a value indicating "yes" or "no") indicating whether a given pixel in the image is part of an image region depicting a human figure. In some cases, labels have multiple available values, such as a set of labels indicating whether a given pixel depicts a human figure, an animal figure, or a background region. Additionally or alternatively, the segmentation data includes numerical data, such as data indicating a probability that a given pixel is an image region depicting a human figure. In some cases, segmentation data includes additional types of data, such as text, database records, or additional data types or structures.

For simplicity, the examples used herein will be described with reference to images depicting one or more human figures. However, is to be understood that some or all of the techniques described herein can be applied to additional subjects, such as, without limitation, nonhuman subjects (e.g., animals), mechanical subjects (e.g., vehicles, robots), environmental subjects (e.g., buildings, plants), or artistic subjects (e.g., cartoon characters, paintings, computer-generated characters), and images of such subjects. Additionally or alternatively, some or all of the techniques described herein can be applied to image regions based on user input, such as a region indicated by use of a "lasso" or "marquee" tool in a user interface of an image editing application.

As used herein, the term "neural network" refers to one or more computer-implemented networks capable of being trained to achieve a goal. Unless otherwise indicated, references herein to a neural network include one neural network or multiple interrelated neural networks that are trained together. In some cases, a neural network (or a component of a neural network) produces output data, such as segmentation data, data indicating image features, or other suitable types of data. Examples of neural networks include, without limitation, CNNs, encoder neural networks (e.g., "encoders"), decoder neural networks (e.g., "decoders"), dense-connection neural networks, and other types of neural networks.

As used herein, the term "layer" refers to an analysis stage in a neural network module. Layers perform types of analysis that are related to the type of neural network. For example, layers in an encoder perform different types of analysis on an input image. In some cases, each particular encoder layer provides features based on the particular analysis performed by that layer. In some cases, each particular encoder layer downsamples a received image, such as to perform the analysis of that particular encoder layer. An additional encoder layer performs additional downsampling, based on an additional type of encoder analysis. In some cases, each round of downsampling reduces the visual quality of the output image, but provides features based on the related analysis performed by that encoder layer.

Referring now to the drawings, FIG. 1 is a diagram depicting an example of an environment 100 in which segmentation data is generated for an image. The environment 100 includes an image editing application 180, and an image segmentation module 170. In some embodiments, the image segmentation module 170 is included in the image editing application 180, as depicted in FIG. 1. Additionally or alternatively, the image segmentation module 170 and the image editing application 180 operate separately, such as by operating as multiple applications on a computing system, or by operating as multiple applications on multiple computing systems. In some cases, the image segmentation module 170 and the image editing application 180 communicate via one or more networks, such as network 190.

The image segmentation module 170 receives an image for segmentation, such as an image 110. The image 110 includes semantic content, such as one or more human figures. In some cases, the image segmentation module 170 receives the image 110 from the image editing application 180. Additionally or alternatively, the image 110 is received from an external source, such as a data repository 195, or an additional computing system 197. For example, the image 110 is received from an additional computing system such as (without limitation) a digital camera 197a, a personal computer 197b, or a personal computing device 197c (e.g., a tablet or smartphone). In some cases, the external source is a network-accessible virtual storage or computing system (e.g., a "cloud" configuration) that is accessible via the network 190.

In the environment 100, the image segmentation module 170 generates segmentation data 160 based on the received image 110. The segmentation data 160 includes data indicating one or more regions of the image 110 that are related, such as a region of image 110 that represents a human figure. In some cases, the image segmentation module 170 generates the segmentation data 160 in response to information received from the image editing application 180. The information can include a command to generate the segmentation data 160, such as a command generated by the image editing application 180 or received via an associated user interface. Additionally or alternatively, the image segmentation module 170 generates the segmentation data 160 in response to information received from one of the additional computing systems 197. For example, the additional computing system 197 can provide, via the network 190, a command to one or both of the image editing application 180 or the image segmentation module 170 to generate the segmentation data 160.

In an embodiment, the image segmentation module 170 provides the segmentation data 160 related to the image 110. For example, the segmentation data 160 is provided to the image editing application 180, or to an associated user interface. Additionally or alternatively, the segmentation data 160 is provided to one or more of the data repository 195 or to an additional computing system 197. In some cases, the segmentation data is provided to an image editing application, including, but not limited to, image editing application 180, for additional processing. For example, the image editing application 180 performs additional image processing related to the image 110, based on received segmentation data 160.

Figure 2:
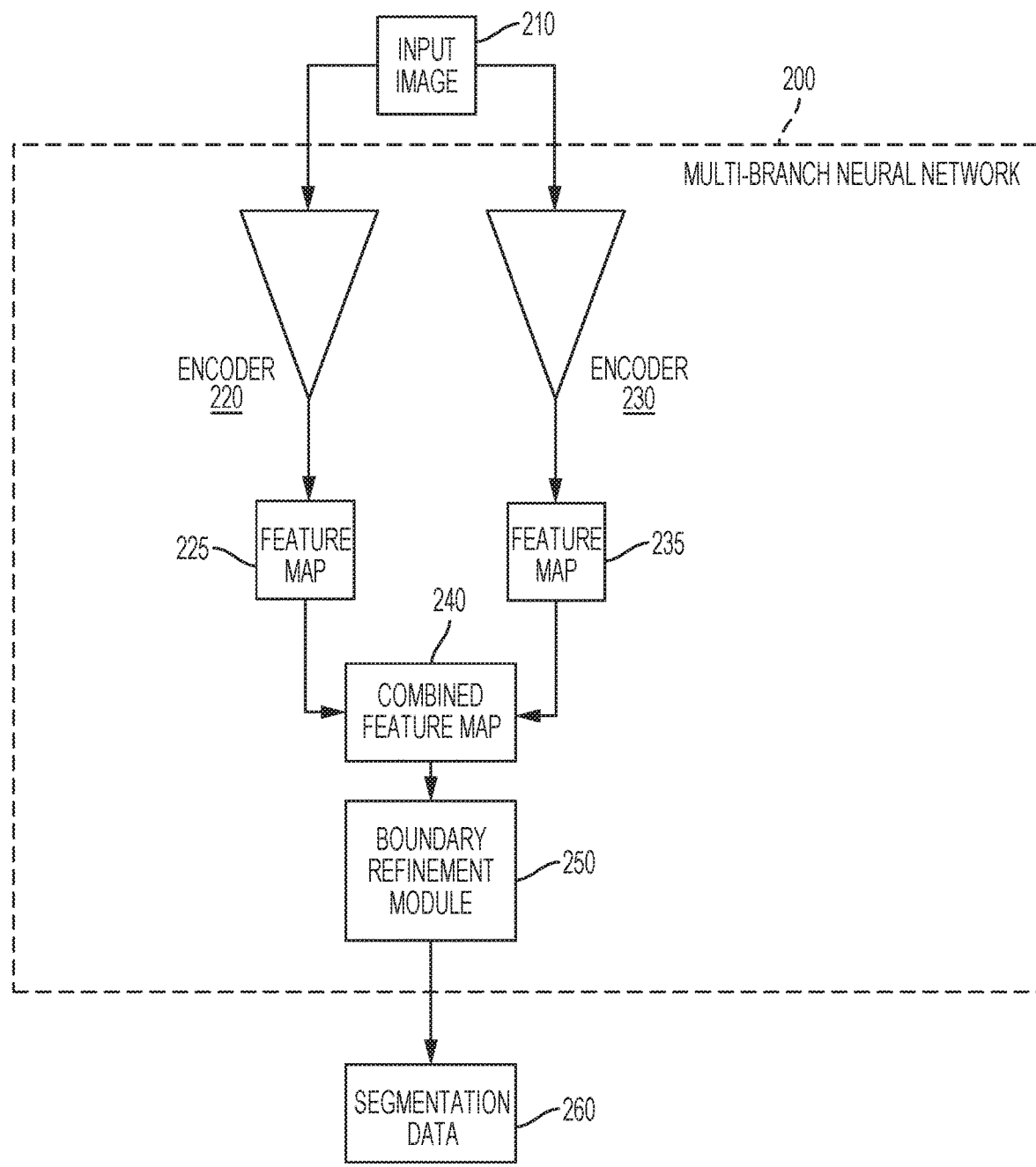
FIG. 2 is a block diagram depicting an example of a multi-branch neural network included in a segmentation module, according to certain embodiments.

In some embodiments, a segmentation module includes one or more neural networks. Additionally or alternatively, the one or more neural networks are configured together, such as a group of related neural networks that are trained together to produce output based on a given input image. FIG. 2 is a diagram depicting an example of a multi-branch neural network 200. In some embodiments, the multi-branch neural network 200 is included in a segmentation module, such as image segmentation module 170. The multi-branch neural network 200 receives an input image 210. The image 210 is received, for example, from an image editing application, a cloud-configured storage or computing system, or an additional computing system. In some cases, the image 210 is comprised of pixels (e.g., an image in a .jpeg, .gif, or bitmap file format). Additionally or alternatively, the image 210 is comprised of vector-based graphical information (e.g., an image in a .svg, .ai, or .dwg file format). In some cases, an image including vector-based data is converted to an image including pixel-based data.

The multi-branch neural network 200 includes multiple encoders, such as encoder 220 and encoder 230. The encoders 220 and 230 are trained to extract features from an image, and to provide respective feature maps 225 and 235 based on the extracted features. In some cases, the encoders 220 and 230 have similar structure and training, and provide feature maps 225 and 235 that include similar data describing the extracted features. Additionally or alternatively, encoder 220 has a structure or training, or both, that are different from the structure and training of encoder 230. For example, the encoder 220 has a structure that includes multiple neural network layers that are trained to extract high-level features from an image. Additionally or alternatively, the encoder 230 has a structure that includes few or one neural network layers that are trained to extract low-level features from an image. In some cases, additional branches of the multi-branch neural network 200 include additional neural networks, such as additional encoders having training or structure suitable for extracting additional features or types of features.

In an embodiment, the image 210 is received by each of the encoder 220 and the encoder 230. The encoder 220 analyzes the image 210 and extracts one or more features of the image 210 based on the analysis by encoder 220. The encoder 220 generates a feature map 225 that includes data describing the features extracted by encoder 220. Additionally or alternatively, the encoder 230 analyzes the image 210 and extracts one or more features of the image 210 based on the analysis by encoder 230. The encoder 230 generates a feature map 235 that includes data describing the features extracted by encoder 230. In some cases, the encoders 220 and 230 extract similar features, and the feature maps 225 and 235 include similar data. Additionally or alternatively, the encoders 220 and 230 extract different features or different types of features, and each of the feature maps 225 and 235 include respective data describing the features extracted by the respective encoder. In some cases, additional branches of the multi-branch neural network 200 generate additional feature maps based on the received image 210.

The multi-branch neural network 200 combines the feature maps generated by the multiple branches. For example, the multi-branch neural network 200 generates combined feature map 240 based on a combination of the feature maps 225 and 235. Any suitable combination technique may be used, such as concatenation, convolution, mathematical operation (e.g., addition), analysis by an additional neural network (e.g., a decoder), or any other suitable technique. In some cases, concatenation allows combination of the feature maps without computationally intensive analysis or post-processing stages.

In the multi-branch neural network 200, the combined feature map 240 is provided to a boundary refinement module 250. In some embodiments, the boundary refinement module 250 includes one or more neural networks, such as a dense-connection neural network. Based on analysis of the feature data included in the combined feature map 240, the boundary refinement module 250 determines boundaries of one or more regions of the image 210. For example, the combined feature map 240 includes one or more channels that are respectively associated with one or more pixels of the image 210. The boundary refinement module 250 analyzes the channels, and determines whether the associated pixel or pixels are included in a region of the image 210, such as a region depicting a human figure.

In an embodiment, the multi-branch neural network 200 provides segmentation data, such as segmentation data 260. The segmentation data 260 is provided, for example, by the boundary refinement module 250. Additionally or alternatively, the segmentation data 260 is based on analysis of the combined feature map 240. In some cases, the segmentation data includes information describing related areas of the image 210. For example, the segmentation data 260 includes label data associated with pixels included in the image 210, such as a set of labels, each label indicating whether a respective associated pixel is part of a region depicting a human figure. In some cases, label data is provided as a digital mask, such as a black-and-white image in which pixel color indicates the label value (e.g., black for outside of region, white for included in region). Additionally or alternatively, the segmentation data 260 includes numerical data associated with the image 210, such as a set of probabilities. Each probability in the set indicates, for example, a likelihood of whether a given pixel is included in a region depicting a human figure.

Figure 3:
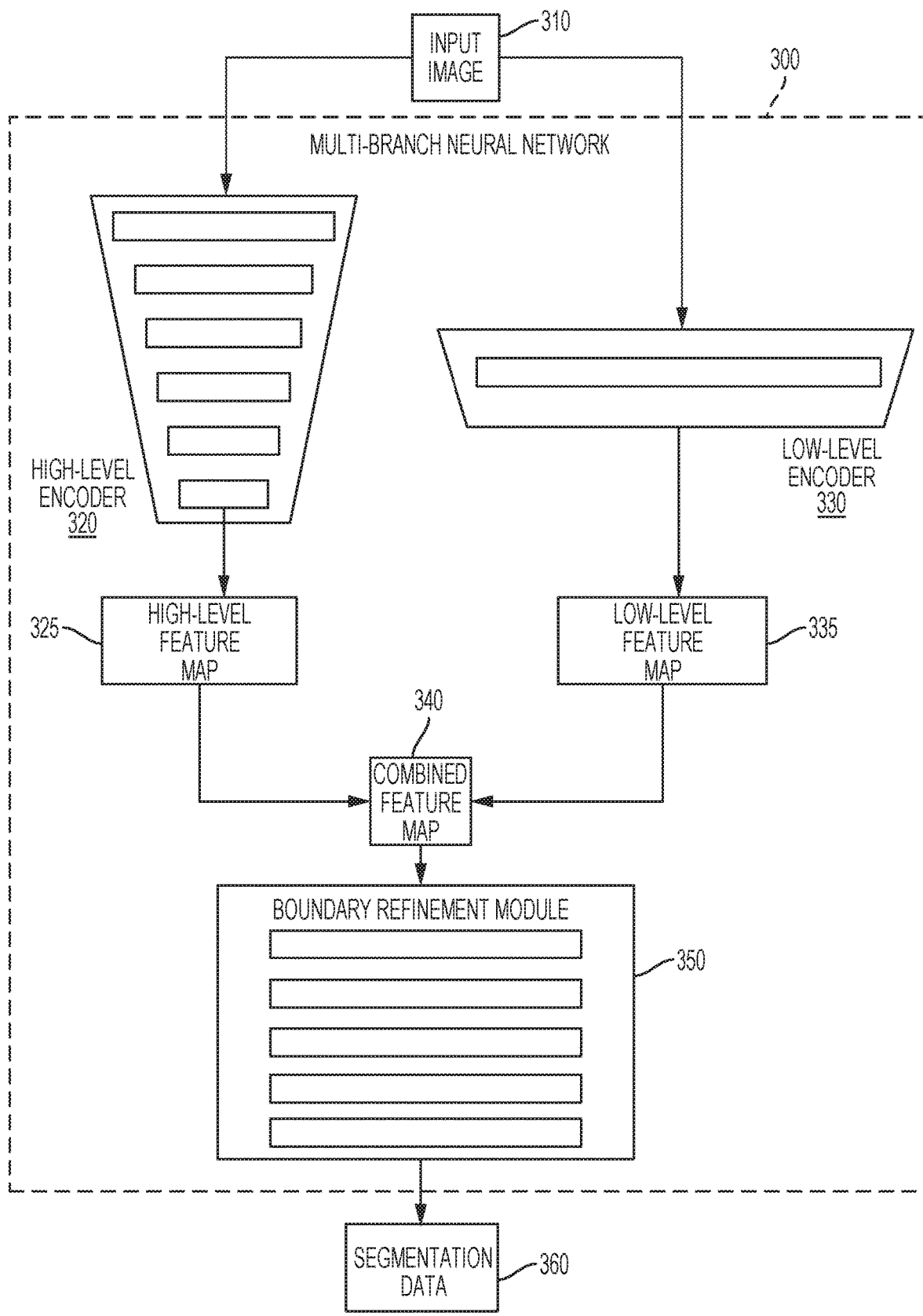
FIG. 3 is a block diagram depicting an example of a multi-branch neural network with asymmetric branches, such as an asymmetric multi-branch neural network included in a segmentation module, according to certain embodiments.

In some embodiments, a multi-branch neural network includes branches having different components or functionality (e.g., "asymmetric" branches). For example, a multi-branch neural network includes branches with respective neural networks, such that a first branch includes a first neural network with first structure and training, and a second branch includes a second neural network with second structure and training. FIG. 3 is a diagram depicting an example of a multi-branch neural network 300 with asymmetric branches. In some embodiments, the multi-branch neural network 300 is included in a segmentation module, such as image segmentation module 170. The multi-branch neural network 300 receives an input image 310, such as described elsewhere herein.

The multi-branch neural network 300 includes multiple branches, such as a high-level branch and a low-level branch including a low-level encoder 330. In some cases, the high-level branch includes a neural network, such as high-level encoder 320, that extracts high-level features. For example, the high-level encoder 320 generates a map of high-level features represented by a low-resolution data structure that is smaller than the received image. Additionally or alternatively, the low-level branch includes a neural network, such as, that extracts low-level features. In some cases, the map of the high-level features is represented by a low-resolution data structure that is smaller than the received image. For example, the low-level encoder 330 generates a map of the low-level features represented by a high-resolution data structure that is similar in size to the received image.

In some cases, additional branches of the multi-branch neural network 300 include additional neural networks that are capable of extracting additional features or feature types.

In an embodiment, the high-level encoder 320 includes a deep CNN with a relatively large number of layers (e.g., about 10 or more layers). Based on the input image 310, the high-level encoder 320 extracts high-level image features, such as features indicating semantic content of the image 310 (e.g., presence of human figures, presence of multiple figures). In some cases, the high-level encoder 320 has structure, or training, or both, that provide a data structure indicating a compact representation (e.g., "bottleneck") of the extracted high-level features, such as a low-resolution feature map of relatively small size. For example, the bottleneck includes a feature map with one or more of relatively few channels (e.g., two channels), relatively low resolution (e.g., resolution of 14×14), or relatively few dimensions (e.g., three dimensions). In some cases, the high-level encoder 320 provides the bottleneck as an output, such as included in a high-level feature map 325.

Additionally or alternatively, the low-level encoder 330 includes a shallow CNN with a relatively small number of layers (e.g., about one layer). Based on the input image 310, the low-level encoder 330 extracts low-level image features, such as features indicating granular content of the image 310 (e.g., colors of pixels, edges between groups of pixels). In some cases, the low-level encoder 330 has structure, or training, or both, that provide a data structure indicating a representation of the extracted low-level features, such as a high-resolution feature map of relatively large size. For example, the data structure includes a feature map with one or more of relatively many channels (e.g., 64 channels) or relatively high resolution (e.g., resolution equivalent to the resolution of the input image 310). In some cases, the low-level encoder 330 provides the data structure as an output, such as included in a low-level feature map 335.

The multi-branch neural network 300 combines the feature maps generated by the multiple branches. For example, the multi-branch neural network 300 generates combined feature map 340 based on a combination (e.g., concatenation) of the high-level feature map 325 and the low-level feature map 335. The combined feature map 340 is provided to a boundary refinement module 350. In some embodiments, the boundary refinement module 350 includes a dense-connection neural network. The dense-connection neural network includes, for example, multiple densely connected units. Each densely connected unit includes, for example, multiple layers (e.g., about three layers), and is capable of analyzing an input, such as a feature map, to determine boundaries of one or more regions of an image associated with the input. For example, one or more densely connected units included in the boundary refinement module 350 analyzes at least the combined feature map 340 and determines boundaries of regions in image 310 based on the analysis. In some cases, a given densely connected unit analyzes a combination of the combined feature map 340 with an output of a preceding densely connected unit, such that the given densely connected unit determines boundaries based on the combination of the boundaries as determined by the preceding densely connected unit and on the features included in the combined feature map 340. In some cases, the boundaries (including boundaries determined by a given densely connected unit, boundaries determined by the dense-connection neural network, or both) indicate whether pixels of the image 310 are included in a region depicting a human figure. In some embodiments, the dense-connection neural network determines accurate boundaries of a region of the image (e.g., a segmentation area) without using a stage of post-processing.

In an embodiment, the multi-branch neural network 300 provides segmentation data, such as segmentation data 360 provided by the boundary refinement module 350. Additionally or alternatively, the segmentation data 360 is based on the boundaries as determined by the dense-connection neural network included in the boundary refinement module 350. In some cases, the segmentation data 360 includes information describing related areas of the image 310, such as label data, numerical data, or additional suitable information. For example, the segmentation data 360 includes a set of probabilities indicating likelihoods of whether respective pixels of the image 310 are included in a region depicting a human figure.

Figure 4:
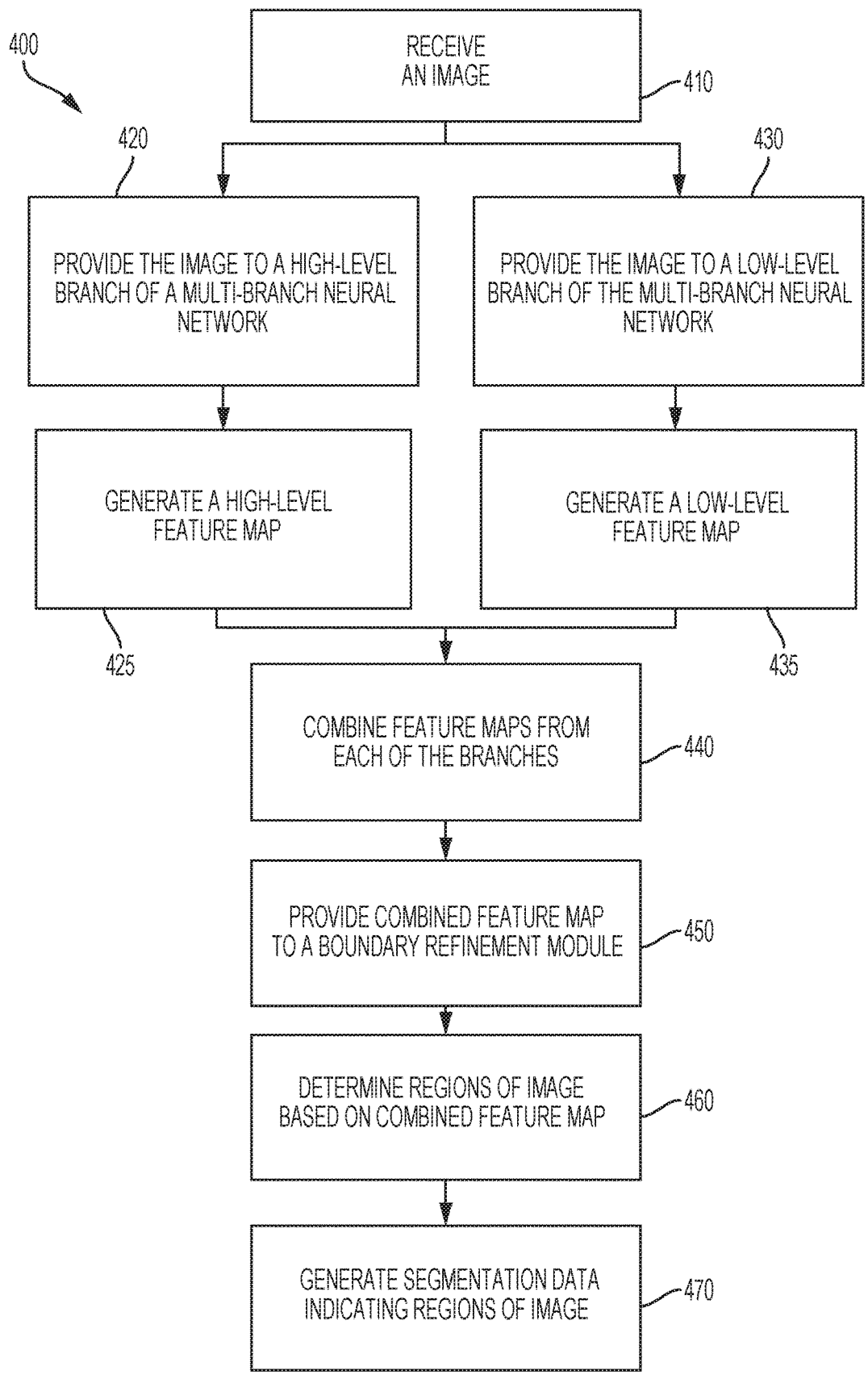
FIG. 4 is a flow chart depicting an example of a process for determining segmentation data using a multi-branch neural network, according to certain embodiments.

FIG. 4 is a flow chart depicting an example of a process 400 for determining segmentation data using a multi-branch neural network. In some embodiments, such as described in regards to FIGS. 1-3, a computing device executing a multi-branch neural network implements operations described in FIG. 4, by executing suitable program code. For illustrative purposes, the process 400 is described with reference to the examples depicted in FIGS. 1-3. Other implementations, however, are possible.

At block 410, the process 400 involves receiving an image. For example, an image segmentation module, such as the image segmentation module 170, receives a graphical digital image, such as image 110. Additionally or alternatively, one of multi-branch neural networks 200 or 300 receives the respective images 210 or 310. In some cases, the received image includes pixels, or is modified to include pixels.

The process 400 involves providing the image to multiple branches of a multi-branch neural network. In some cases, each branch includes one or more neural networks for that branch. The process 400 is described with regards to a multi-branch neural network including a high-level branch and a low-level branch, such as in regards to blocks 420 and 430. However, some embodiments include additional branches including additional neural networks, such as neural networks for extracting additional high- or low-level features, neural networks for extracting features of additional types, or other suitable neural networks.

At block 420, the process 400 involves providing the image to a high-level branch of a multi-branch neural network. In some cases, the high-level branch includes a high-level encoder neural network for extracting semantic features or other high-level features of the received image. For example, the high-level encoder 320 extracts high-level features from the image 310.

At block 425, the process 400 involves generating a high-level feature map, describing high-level features extracted from the image. For example, the high-level branch generates the high-level feature map based on semantic qualities of the image. In some cases, the high-level feature map has a size, resolution, channel quantity, or other characteristics based on the structure and training of a neural network included in the high-level branch. For example, the high-level encoder 320 provides a high-level feature map 325, based on analysis of the image 310.

At block 430, the process 400 involves providing the image to a low-level branch of the multi-branch neural network. In some cases, the low-level branch includes a low-level encoder neural network for extracting low-level features of the received image. For example, the low-level encoder 330 extracts low-level features from the image 310.

At block 435, the process 400 involves generating a low-level feature map, describing low-level features extracted from the image. For example, the low-level branch generates the low-level feature map based on fundamental qualities of the image. In some cases, the low-level feature map has a size, resolution, channel quantity, or other characteristics based on the structure and training of a neural network included in the low-level branch. For example, the low-level encoder 330 provides a low-level feature map 335, based on analysis of the image 310.

In some embodiments, operations related to one or more of blocks 430 and 435 are repeated for further additional branches of the multi-branch neural network. The further additional branches provide, for example, further additional feature maps, each respective feature map describing features based on the respective structure and training of the respective branch.

At block 440, the process 400 involves combining the feature maps received from the multiple branches of the multi-branch neural network. For example, the multi-branch neural network 200 generates the combined feature map 240 based on a combination of the feature maps 225 and 235. In some cases, the feature maps are combined using concatenation, convolution, mathematical operation (e.g., addition), analysis by an additional neural network (e.g., a decoder), or any other suitable technique. For example, the high-level feature map is concatenated with the low-level feature map, or the low-level feature map is concatenated with the high-level feature map. In some cases, one or more of the feature maps are modified (e.g., resized), and the concatenation is based on the modified feature map.

At block 450, the process 400 involves providing the combined feature map to a boundary refinement module. For example, the multi-branch neural network 200 provides the combined feature map 240 to a boundary refinement module 250.

At block 460, the process 400 involves determining related regions of the received image based on the combined feature map. In some cases, a boundary refinement module determines related regions of the image based on extracted feature represented by the combined feature map. For example, dense-connection neural networks included in the boundary refinement module 350 determine whether each given pixel in the image 310 is included in a related region. The determination of the dense-connection neural networks is based, for example, on analysis of features, represented by combined feature map 340, that are associated with each given pixel.

At block 470, the process 400 involves generating segmentation data indicating one or more related regions of the image. In some cases, the segmentation data is based on the determined regions of the image. For example, a boundary refinement module generates segmentation data indicating whether each pixel of the received image is included in a related region in the image, such as a region depicting a human figure.

Figure 5:
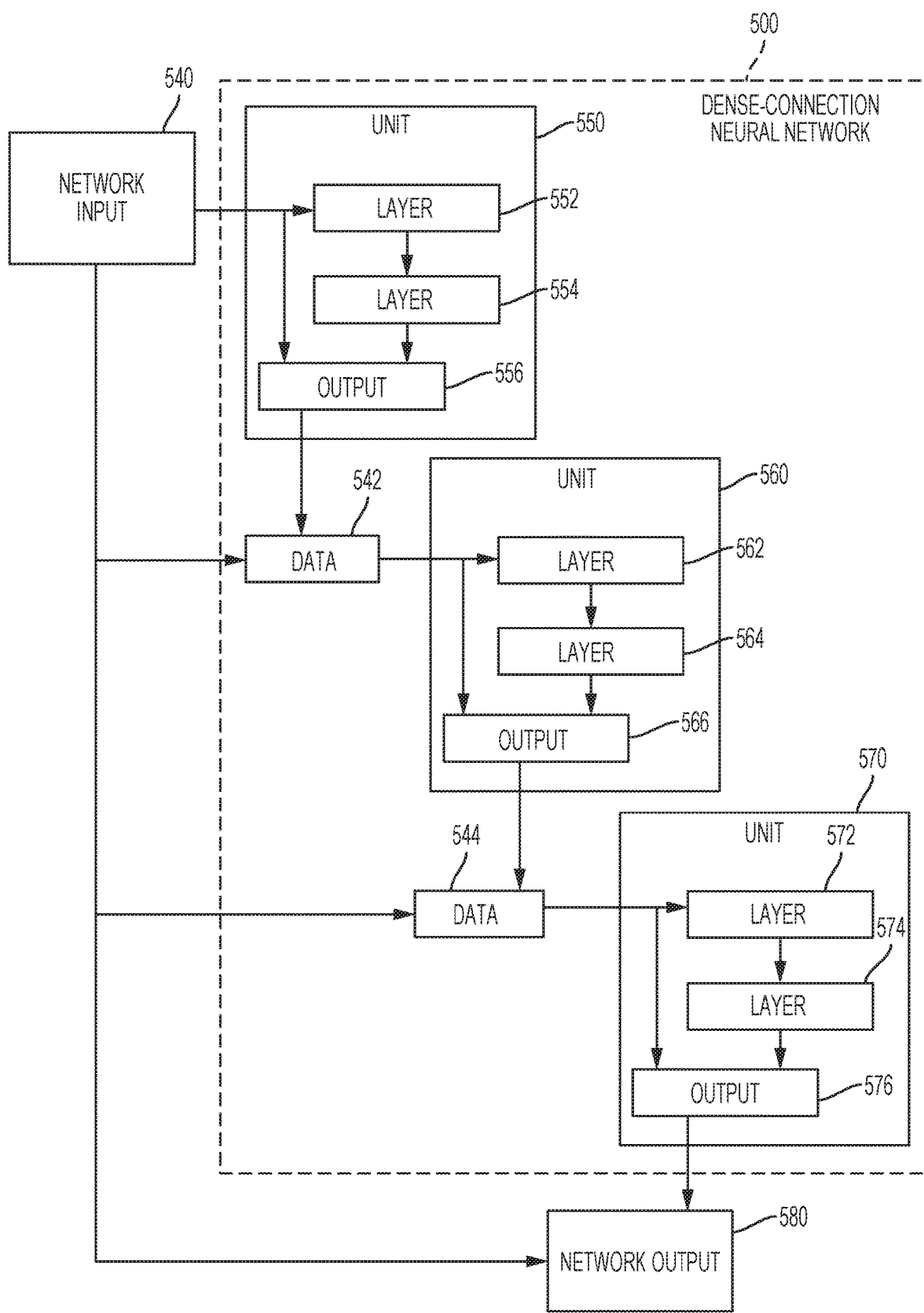
FIG. 5 is a block diagram depicting an example of a dense-connection neural network included in a boundary refinement module, according to certain embodiments.

FIG. 5 is a diagram depicting an example of a dense-connection neural network 500. In some cases, the dense-connection neural network 500 is included in a boundary refinement module, such as the boundary refinement module 350. The dense-connection neural network 500 includes one or more densely connected units, such as units 550, 560, and 570. Each densely connected unit includes one or more layers, such as layers 552 and 554 included in unit 550. In some embodiments, one or more of the layers comprise convolutional layers. The dense-connection neural network 500 receives an input, such as a network input 540. In some cases, the network input 540 is a feature map, such as combined feature map 340. Additionally or alternatively, the dense-connection neural network 500 provides an output, such as a network output 580. In some cases, segmentation data, such as segmentation data 360, is included in the network output 580, or generated based on the network output 580, or both.

In the dense-connection neural network 500, each densely connected unit includes multiple layers. For example, unit 550 includes layers 552 and 554. Unit 560 includes layers 562 and 564. Unit 570 includes layers 572 and 574. In some cases, additional layers are included in some or all of the units. Within a unit, a layer analyzes, for example, the output of a previous layer. Additionally or alternatively, the input to a given unit is combined with the output of the layers of the given unit. The input of the unit and the layer output are combined using any suitable technique, such as concatenation. In some cases, the overall output of the given unit is combined with additional information, such as an input of the dense-connection neural network 500.

For example, unit 550 receives network input 540 as the input for the unit 550. Within unit 550, layer 552 receives and analyzes the network input 540. Layer 554 receives and analyzes the output of layer 552. The network input 540 is combined (e.g., concatenated) with the output of the layer 554 to provide overall output 556. The overall output 556 of the unit 550 is combined with the network input 540 to provide a combined data 542. In some cases, the combined data 542 is based on a concatenation of the network input 540 and the overall output 556 of unit 550.

In the dense-connection neural network 500, the unit 560 receives the combined data 542 as the input for unit 560. Within unit 560, layer 562 receives and analyzes the combined data 542. Layer 564 receives and analyzes the output of layer 562. The combined data 542 is combined (e.g., concatenated) with the output of the layer 564 to provide overall output 566. The overall output 566 of the unit 560 is combined with the network input 540 to provide a combined data 544. In some cases, the combined data 544 is based on a concatenation of the network input 540 and the overall output 566 of unit 560.

Additionally or alternatively, the unit 570 receives the combined data 544 as the input for unit 570. Within unit 570, layer 572 receives and analyzes the combined data 544. Layer 574 receives and analyzes the output of layer 572. The combined data 544 is combined (e.g., concatenated) with the output of the layer 574 to provide overall output 576. The overall output 576 of the unit 570 is combined with the network input 540 to provide the network output 580. In some cases, the network output 580 is based on a concatenation of the network input 540 and the overall output 576 of unit 570.

In the dense-connection neural network 500, the combination of inputs of the neural network, units, or layers with the outputs of the neural network, units, or layers improves dense connections between the units and layers within the neural network. In some embodiments, the dense connections within the neural network, such as dense-connection neural network 500, allow more effective training of the neural network to determine regions of a received image. For example, the dense connections allow more effective training of the neural network to determine boundaries between regions of the image.

Input and Output of Neural Network Modules

In some embodiments of a multi-branch neural network, a high-level branch and a low-level branch receive a same input image, and produce different outputs based on the received image. The output of each branch is based on the respective structure and training of one or more neural network modules in the branch. In some cases, a neural network included in a branch includes one or more layers capable of extracting features of an image provided to the neural network. The layer of the neural network generates a feature map representing the features extracted by the layer. The layer provides the feature map, for example, as an input to one or more of an additional layer in the neural network, or to one or more modules in the multi-branch neural network, including additional neural network modules. In some cases, the feature map is represented by a data structure having a number of channels, a spatial resolution, a number of dimensions, or other suitable characteristics. The characteristics of the feature map data structure are based on, for example, the structure or training of the layer that generates the feature map.

For example, a low-level encoder (e.g., in a low-level branch) includes a relatively small number of layers (e.g., about 1-3 layers) capable of extracting features of an image provided as an input to the low-level encoder. The layer of the low-level encoder extracts low-level features of an input image, and generates a feature map having a relatively large number of channels, and a spatial resolution that is relatively high. In some cases, the spatial resolution of the low-level feature map is equivalent to a spatial resolution of the input image. For example, a low-level encoder that receives an input image having 3 channels (e.g., red-green-blue color channels) and a resolution of 224×224 (e.g., 224×224 pixels in the image) extracts low-level features based on the input image. A layer in the low-level encoder generates, based on the extracted features, an output feature map having 64 channels and a spatial resolution of 224×224 (e.g., equivalent to the resolution of the image). The low-level encoder provides the 64-channel 224×224 output feature map as an input to, for example, a boundary refinement module. In some cases, the 64-channel 224×224 output feature map is combined with an additional feature map and the combined feature map is provided as an input to the boundary refinement module.

Additionally or alternatively, a high-level encoder (e.g., in a high-level branch) includes a relatively large number of layers (e.g., about 10 or more layers) capable of extracting high-level features of an image provided as an input to the high-level encoder. Each layer of the high-level encoder extracts features of an input image, and generates a feature map based on the structure or training of the layer. In some cases, each layer generates the feature map based on one or more of the input image or an additional feature map generated by an additional layer of the high-level encoder. For example, a high-level encoder that receives an input image having three channels and a resolution of 224×224. A layer in the high-level encoder extracts features based on the input image, and generates, based on the extracted features, an output feature map having 64 channels and a spatial resolution of 112×112. The layer provides the 64-channel 112×112 output feature map as an input to an additional layer, which extracts features based on the 64-channel 112×112 feature map, and generates an additional output feature map having 64 channels and a spatial resolution of 56×56. The additional layer provides the 64-channel 56×56 output feature map as an input to a further layer. Additional layers in the high-level encoder generate feature maps based on a feature map received as an input from a previous layer. In some cases, the output of a preceding layer (or module) is an input to a succeeding layer (or module). In some cases, a particular layer in the high-level encoder provides, based on one or more feature maps from one or more previous layers, a high-level feature map having relatively few channels and relatively low spatial resolution. For example, the particular layer provides as an output a high-level feature map having 2 channels and a spatial resolution of 14×14. In some cases, the high-level encoder provides a bottleneck (such as described in regards to FIG. 3) including the 2-channel 14×14 output feature map, for example, to a boundary refinement module. In some cases, the 2-channel 14×14 output feature map is combined with an additional feature map and the combined feature map is provided to the boundary refinement module.

In an embodiment, a multi-branch neural network combines a low-level feature map output by a low-level branch with a high-level feature map output by a high-level branch, and provides the combined feature map as an input to a boundary refinement module. For example, a 64-channel 224×224 low-level feature map is combined with a 2-channel 14×14 high-level feature map. In some cases, the combined feature map is generated based on a concatenation of the high-level feature map and the low-level feature map. Additionally or alternatively, one or more of the high-level feature map and the low-level feature map are modified to adjust a feature map characteristic. For example, the 2-channel 14×14 high-level feature map is modified to match a spatial resolution of the 64-channel 224×224 low-level feature map. The modification includes, for example, a resizing (e.g., by bilinear upsampling) of the 2-channel 14×14 high-level feature map to a 2-channel 224×224 high-level feature map. A combined feature map having 66 channels (e.g., 2 high-level channels and 64 low-level channels) and a spatial resolution of 224×224, for example, is generated based on a concatenation of the modified 2-channel 224×224 high-level feature map with the 64-channel 224×224 low-level feature map. In some cases, the 66-channel 224×224 combined feature map is provided as an input to a boundary refinement module. A process, such as process 400 as described in regards to FIG. 4, performs operations using one or more of the combination techniques described above, such as operations related to block 440.

Example of a Computing System for Image Segmentation

Figure 6:
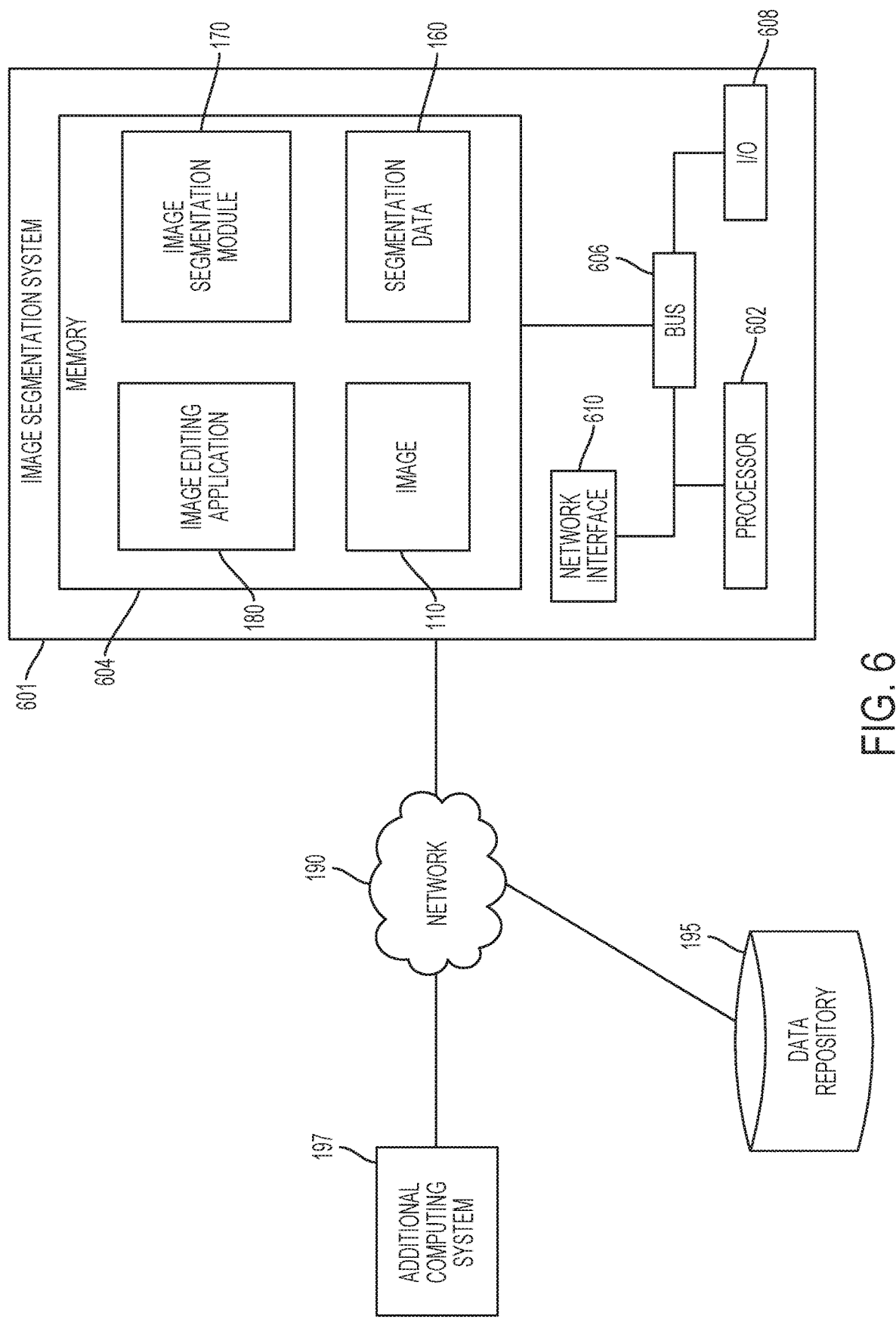
FIG. 6 is a block diagram depicting an example of a computing system for implementing an image segmentation system, according to certain embodiments.

Any suitable computing system or group of computing systems can be used for performing the operations described herein. For example, FIG. 6 is a block diagram depicting a computing system capable of performing operations related to image segmentation, according to certain embodiments. The computing system, such as image segmentation system 601, can include any suitable computing system, such as (without limitation) a personal computer, a tablet computer, a mobile computing device (e.g., a smartphone, a wearable computer), a virtual computing system (e.g., a cloud system, a local virtual device), or any other suitable computing system.

The depicted example of the image segmentation system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or other suitable processing device. The processor 602 can include any number of processing devices, including one.

The memory device 604 includes any suitable non-transitory computer-readable medium for storing the color selection system 110, the correlated color images 135, the point cloud model 130, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The image segmentation system 601 may also include a number of external or internal devices such as input or output devices. For example, the image segmentation system 601 is shown with an input/output ("I/O") interface 608 that can receive input from input devices or provide output to output devices. A bus 606 can also be included in the image segmentation system 601. The bus 606 can communicatively couple one or more components of the image segmentation system 601.

The image segmentation system 601 executes program code that configures the processor 602 to perform one or more of the operations described above with respect to FIGS. 1-5. The program code includes operations related to, for example, one or more of the image 110, the image editing application 180, the image segmentation module 170, the segmentation data 160, one or more neural networks, or other suitable applications or memory structures that perform one or more operations described herein. The program code may be resident in the memory device 604 or any suitable computer-readable medium and may be executed by the processor 602 or any other suitable processor. In some embodiments, the program code described above, the image 110, the image editing application 180, the image segmentation module 170, the segmentation data 160, or the neural networks are stored in the memory device 604, as depicted in FIG. 6. In additional or alternative embodiments, one or more of the image 110, the image editing application 180, the image segmentation module 170, the segmentation data 160, the neural networks, and the program code described above are stored in one or more memory devices accessible via a data network, such as a memory device accessible via a cloud service.

The image segmentation system 601 depicted in FIG. 6 also includes at least one network interface 610. The network interface 610 includes any device or group of devices suitable for establishing a wired or wireless data connection to one or more data networks 190. Non-limiting examples of the network interface 610 include an Ethernet network adapter, a modem, a wireless networking device, and/or the like. In some cases, one or more of an additional computing system 197 or data repository 195 are connected to the image segmentation system 601 via network 190. Additionally or alternatively, the additional computing system 197 can perform some of the operations described herein, such as providing images or operating one or more neural networks. The image segmentation system 601 is able to communicate with one or more of the additional computing system 197 or data repository 195 using the network interface 610. Although FIG. 9 depicts the image segmentation module 170 and image editing application 180 as resident in memory 604 of the image segmentation system 601 other embodiments are possible, including one or more of the image segmentation module 170 and image editing application 180 communicating with image segmentation system 601 via the networks 190.

Examples of Experimental Results

FIGS. 7, 8, 9, 10, and 11 depict results from experiments involving certain embodiments of multi-branch neural networks described herein. In these examples, segmentation results of the multi-branch neural network was compared with segmentation results of an existing network using a combination of a CNN using dilated convolution and a stage of post-processing using densely-connected conditional random fields (e.g., dense-CRF). The multi-branch neural network was trained using images included in publicly available datasets (e.g., COCO-person, Flickr-hp, Flickr-portrait, DUT-Omron, MSRA10K). In addition, the existing combination network was also trained using images from the publicly available datasets. In the experiments, about 80% of the images from the datasets were used to train the multi-branch neural network and the existing combination network, while the remaining images were used to evaluate performance of the networks.

FIGS. 7, 8, and 9 depict examples of architectures for multiple modules of a multi-branch neural network. In these experiments, the multi-branch neural network includes a high-level branch having a neural network with architecture described in part by FIG. 7. The input of the example high-level branch is an input image including 3 channels and a resolution of 224×224. The output of the example high-level branch is a feature map having 2 channels and a resolution of 14×14. In addition, the multi-branch neural network includes a low-level branch having a neural network with architecture described in part by FIG. 8. The input of the example low-level branch is the 3-channel 224×224 input image, and the output of the example low-level branch is a feature map having 64 channels and a resolution of 224×224. Furthermore, the multi-branch neural network includes a boundary refinement module having an architecture described in part by FIG. 9. The input of the example boundary refinement module is a combined feature map having 66 channels and a resolution of 224×224, based on the combination of the outputs of the example high- and low-level branches. The output of the example boundary refinement module is a data structure including the segmentation data for the input image. The data structure includes values generated by a normalized exponential function (e.g., from a layer using a softmax function), and the generated values are in a range between 0 and 1 (inclusive), indicating a probability that a given pixel is included in a segmentation mask.

Figures 10, 11:
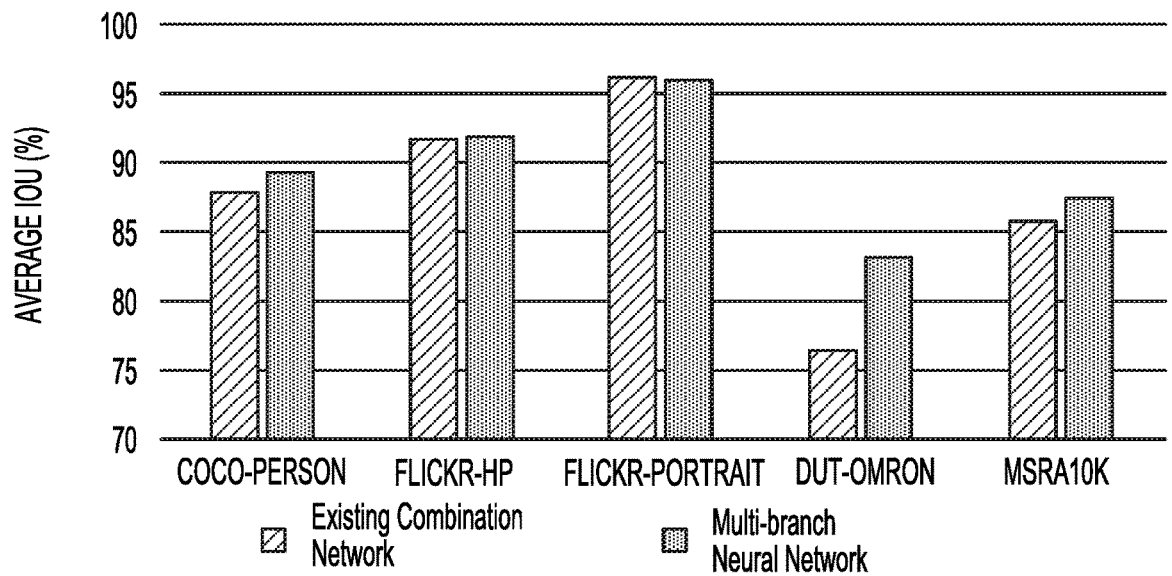
FIG. 10 is a diagram depicting example results of comparisons performed between a multi-branch neural network and an existing combination network, according to certain embodiments.
FIG. 11 is a diagram depicting example results of comparisons performed between a multi-branch neural network and an existing combination network, according to certain embodiments.

In these experiments, the segmentation results of the multi-branch neural network were compared to segmentation results of the existing combination network. In addition, the computing system resources used by each of the networks were compared. FIGS. 10 and 11 depict results of the comparisons performed between the multi-branch neural network and the existing combination network. FIG. 10 depicts results of these experiments including an average intersection-over-union (e.g., "IOU") of the multi-branch neural network and the existing combination network, for each of the datasets. The IOU for a particular image describes a ratio of the true positive segmentation data (e.g., the actual human figure depicted in the image) to the sum of the true positive, false positive (e.g., image regions not depicting the figure, but identified by the network as part of the figure), and false negative (e.g., image regions depicting the figure, but identified by the network as not part of the figure). The average IOU for each dataset is the average of the IOU's for each evaluation image included in the dataset. As shown in FIG. 11, for each of the datasets, with comparable or increased accuracy as compared to the existing combination network. In addition, as shown in FIG. 11, the multi-branch neural network determines segmentation data using fewer computing system resources as compared to the existing combination network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of producing segmentation data for related regions of an image, the method comprising:
    receiving, by a multi-branch neural network, a graphical digital image, the multi-branch neural network comprising a high-level encoder neural network, a low-level encoder neural network, and a boundary refinement module;
    providing the image to the high-level encoder neural network and to the low-level encoder neural network;
    generating, by the high-level encoder neural network, a map of high-level features of the image, wherein the high-level features describe contextual qualities of the image;
    generating, by the low-level encoder neural network, a map of low-level features of the image, wherein the low-level features describe fundamental qualities of the image;
    combining the high-level feature map and the low-level feature map to form a combined feature map;
    providing the combined feature map to a boundary refinement module having a dense-connection neural network including multiple densely connected units, wherein each densely connected unit of the multiple densely connected units receives the combined feature map as an input; and
    receiving, from the boundary refinement module, segmentation data indicating a related region of the image.

2. The method of claim 1, wherein the high-level feature map has a first spatial resolution smaller than a second spatial resolution of the low-level feature map.

3. The method of claim 1, wherein the high-level encoder neural network has more layers than the low-level encoder neural network.

4. The method of claim 1, wherein combining the high-level feature map and the low-level feature map comprises any of:
    concatenating the high-level feature map and the low-level feature map,
    convolving the high-level feature map and the low-level feature map,
    performing a mathematical operation of the high-level feature map and the low-level feature map, or
    analyzing, with an additional neural network, the high-level feature map and the low-level feature map.

5. The method of claim 4, wherein, prior to the concatenating, the high-level feature map is resized to a same spatial resolution as the low-level feature map.

6. The method of claim 1, wherein:
    each densely connected unit of the multiple densely connected units is trained to determine boundaries of the related region of the image, and
    the segmentation data is based on the boundaries determined by each of the multiple densely connected units.

7. The method of claim 1, wherein the segmentation data includes a set of probabilities associated with a set of pixels in the image, wherein each probability in the set of probabilities indicates a likelihood that a respective associated pixel is included in the related region of the image.

8. A non-transitory computer-readable medium embodying program code for producing segmentation data for related regions of an image, the program code comprising instructions which, when executed by a processor, cause the processor to perform operations comprising:
    receiving, by a multi-branch neural network, a graphical digital image, the multi-branch neural network comprising a high-level encoder neural network, a low-level encoder neural network, and a boundary refinement module;
    providing the image to the high-level encoder neural network and to the low-level encoder neural network;
    generating, by the high-level encoder neural network, a map of high-level features of the image, wherein the high-level features describe contextual qualities of the image;
    generating, by the low-level encoder neural network, a map of low-level features of the image, wherein the low-level features describe fundamental qualities of the image;
    combining the high-level feature map and the low-level feature map to form a combined feature map;
    providing the combined feature map to a boundary refinement module having a dense-connection neural network including multiple densely connected units, wherein each densely connected unit of the multiple densely connected units receives the combined feature map as an input; and
    receiving, from the boundary refinement module, segmentation data indicating a related region of the image.

9. The non-transitory computer-readable medium of claim 8, wherein the high-level feature map has a first spatial resolution smaller than a second spatial resolution of the low-level feature map.

10. The non-transitory computer-readable medium of claim 8, wherein the high-level encoder neural network has more layers than the low-level encoder neural network.

11. The non-transitory computer-readable medium of claim 8, wherein combining the high-level feature map and the low-level feature map comprises any of:
    concatenating the high-level feature map and the low-level feature map,
    convolving the high-level feature map and the low-level feature map,
    performing a mathematical operation of the high-level feature map and the low-level feature map, or
    analyzing the high-level feature map and the low-level feature map with an additional neural network.

12. The non-transitory computer-readable medium of claim 8, wherein:
    each densely connected unit of the multiple densely connected units is trained to determine boundaries of the related region of the image, and
    the segmentation data is based on the boundaries determined by each of the multiple densely connected units.

13. The non-transitory computer-readable medium of claim 8, wherein the segmentation data includes a set of probabilities associated with a set of pixels in the image, wherein each probability in the set of probabilities indicates a likelihood that a respective associated pixel is included in the related region of the image.

14. A system for producing segmentation data for related regions of an image, the system comprising:
- a means for receiving, by a multi-branch neural network, a graphical digital image, the multi-branch neural network comprising a high-level encoder neural network, a low-level encoder neural network, and a boundary refinement module;
- a means for providing the image to the high-level encoder neural network and to the low-level encoder neural network;
- a means for generating, by the high-level encoder neural network, a map of high-level features of the image, wherein the high-level features describe contextual qualities of the image;
- a means for generating, by the low-level encoder neural network, a map of low-level features of the image, wherein the low-level features describe fundamental qualities of the image;
- a means for combining the high-level feature map and the low-level feature map to form a combined feature map;
- a means for providing the combined feature map to a boundary refinement module having a dense-connection neural network including multiple densely connected units, wherein each densely connected unit of the multiple densely connected units receives the combined feature map as an input; and
- a means for receiving, from the boundary refinement module, segmentation data indicating a related region of the image.

15. The system of claim 14, wherein the high-level feature map has a first spatial resolution smaller than a second spatial resolution of the low-level feature map.

16. The system of claim 14, wherein the high-level encoder neural network has more layers than the low-level encoder neural network.

17. The system of claim 14, wherein the means for combining the high-level feature map and the low-level feature map comprises any of:
- concatenating the high-level feature map and the low-level feature map,
- convolving the high-level feature map and the low-level feature map,
- performing a mathematical operation of the high-level feature map and the low-level feature map, or
- analyzing the high-level feature map and the low-level feature map with an additional neural network.

18. The system of claim 17, wherein, prior to the concatenating, the high-level feature map is resized to a same spatial resolution as the low-level feature map.

19. The system of claim 14, wherein:
- each densely connected unit of the multiple densely connected units is trained to determine boundaries of the related region of the image, and
- the segmentation data is based on the boundaries determined by each of the multiple densely connected units.

20. The system of claim 14, wherein the segmentation data includes a set of probabilities associated with a set of pixels in the image, wherein each probability in the set of probabilities indicates a likelihood that a respective associated pixel is included in the related region of the image.

* * * * *